July 21, 1964  A. M. HARRIS ET AL  3,141,380
DRIVE MECHANISM

Filed Aug. 2, 1961  2 Sheets-Sheet 2

Inventors
ARTHUR M. HARRIS
ERIC LEDIN
By Roland A. Anderson
Atty

United States Patent Office 3,141,380
Patented July 21, 1964

3,141,380
DRIVE MECHANISM
Arthur M. Harris, San Diego, and Eric Ledin, La Jolla, Calif., assignors, by mesne assignments, to the United States of America as represented by the United States Atomic Energy Commission
Filed Aug. 2, 1961, Ser. No. 128,912
4 Claims. (Cl. 91—2)

The present invention relates generally to a drive mechanism and is more particularly directed to an improved construction and arrangement for a control rod drive mechanism for nuclear reactors.

In a nuclear reactor there is provided a plurality of control rods which include neutron absorbing or "poison" material and which are disposed for movement relative to a position fully within the reactor core, in order to thereby regulate the rate of nuclear reaction within the core. Means are provided for moving the control rods relative to the reactor core, and at least some of the control rods include means for substantially instantaneously driving the control rod into the reactor core, in order to "scram" the reactor when an emergency situation exists.

Figure 1:
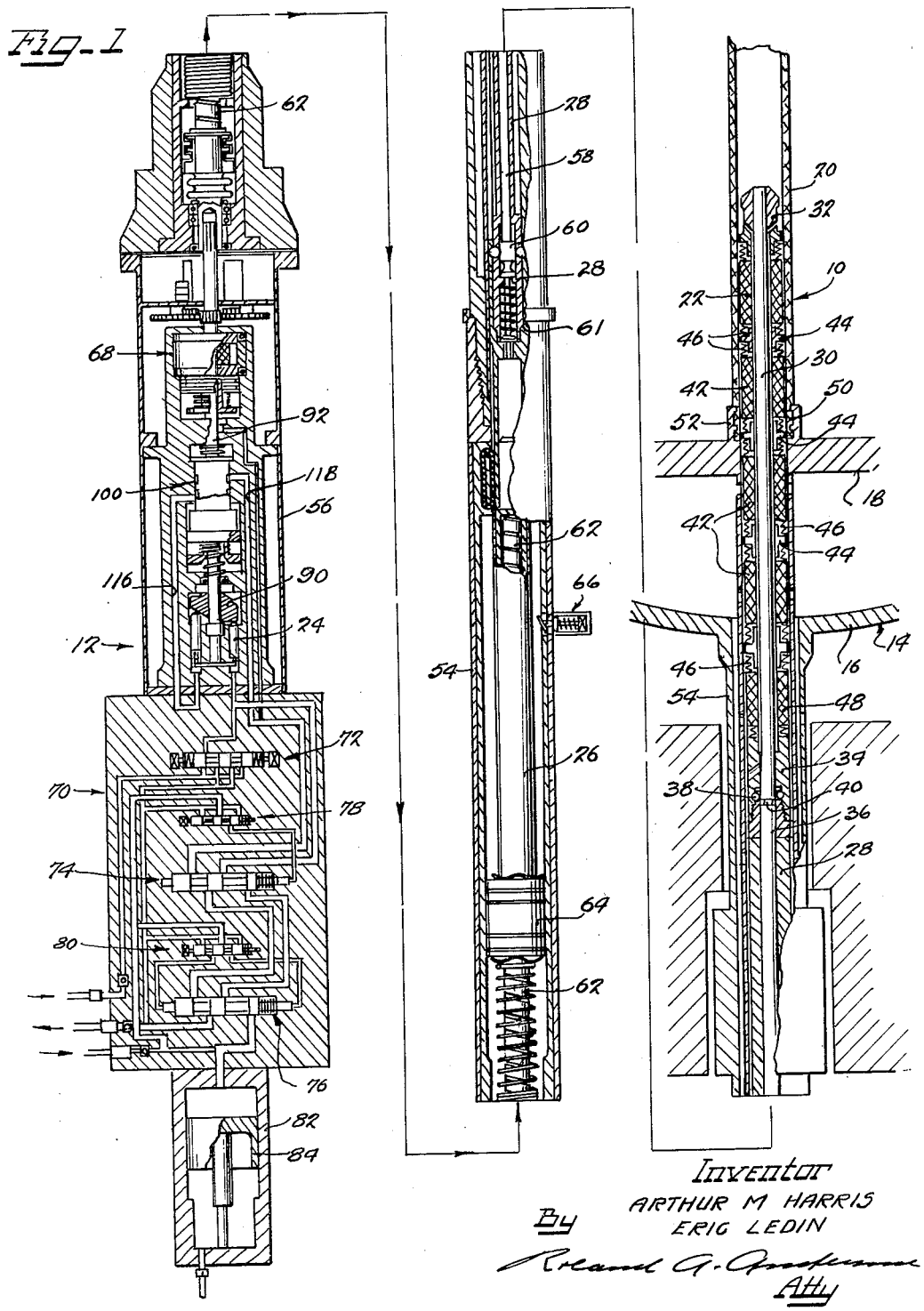
Figure 2:
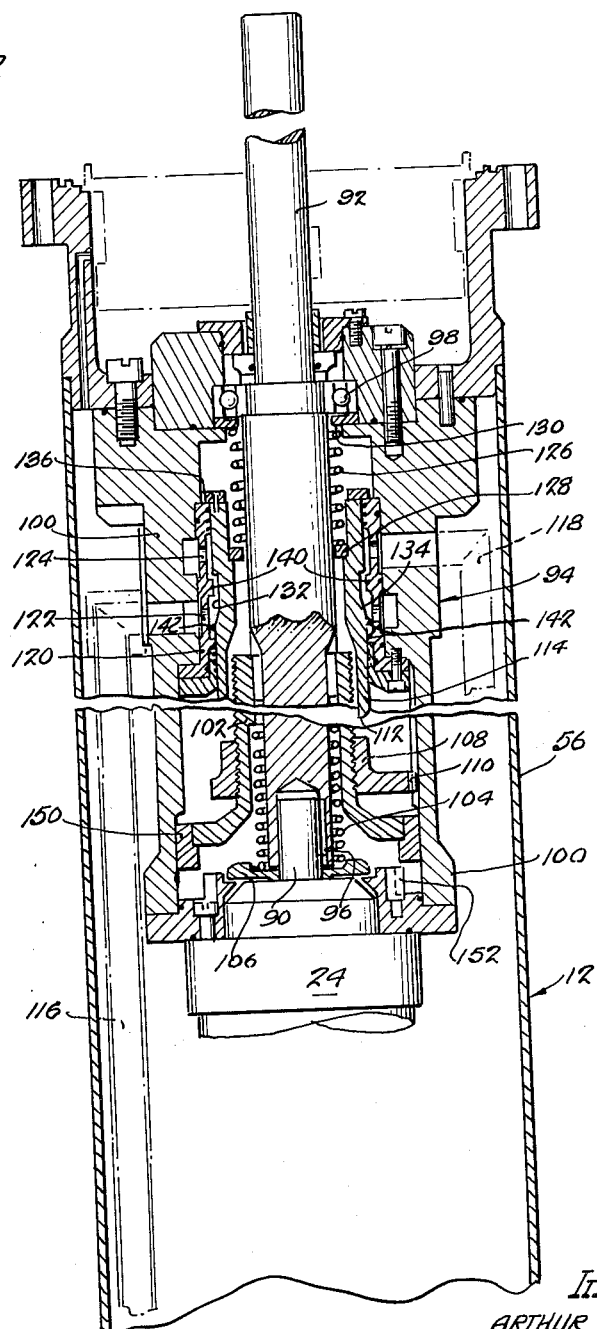

It is a primary object of the present invention to provide a novel and improved form of pressure fluid drive means. A more particular object is to provide an improved means for a control rod in a nuclear reactor, including a deceleration device which is operable to retard the final movement of the control rod into the reactor core. Other objects and advantages will become apparent from the following description of the selected embodiment illustrated in the accompanying drawings, wherein:

FIGURE 1 is a cross-sectional view of the control rod and drive assembly, with the latter shown schematically; and FIGURE 2 is an enlarged cross-sectional view of a portion of the control rod drive, particularly illustrating the deceleration device for the drive.

The illustrated embodiment includes a control rod assembly 10, and a drive assembly 12 which is associated and connected with the lower end portion of the control rod assembly. The illustrated structure is particularly adapted for use with nuclear reactors of the gas-cooled type, wherein the reactor vessel is disposed vertically and the control rods are positioned for movement into and out of the reactor core from a position below the core. However, it will become apparent as the description progresses that various features of the structure described herein may also be used to advantage in connection with other types of nuclear reactors and other mechanisms.

In the illustrated embodiment the nuclear reactor 14 includes a pressure vessel having a bottom wall 16, and a bottom grid plate 18 is disposed in the lower portion of the vessel to provide a support for the reactor core assembly which includes the fuel elements (not shown) and a plurality of control rods for regulating reactivity within the core. The bottom grid plate 18 also provides a support for the control rod guide tubes 20. Since the configuration of the pressure vessel and the detailed construction of the reactor core are not essential elements of the present invention, it is believed that detailed descriptions and drawings of these structures are unnecessary to a proper understanding of the present invention.

With reference particularly to FIGURE 1, it will be seen that the control rod assembly 10 includes a guide tube 20 detachably secured to the grid plate 18 in vertically extending relation thereto, and the control rod 22 including the neutron absorbing material. The control rod drive assembly 12 includes a fluid pressure operated motor 24 which is connected with the control rod through means of an axially movable push rod including a lower hollow section 26 and an upper section 28 which is essentially solid. The drive mechanism is entirely fluid operated and is effective to move the control rod 22 into and out of the guide tube 20 within the reactor core, to thereby regulate the reactivity within the core, and such drive mechanism is also operable under emergency conditions to almost instantaneously drive the control rod to its fully inserted position within the reactor core.

The control rod proper comprises a central support rod 30 which is tubular and preferably formed of a high temperature alloy, and the upper end of this support rod is provided with a lifting knob 32. The latter is brazed or otherwise fixed to the support rod and extends beyond the guide tube when the control rod is fully inserted into the core, so as to afford removal of the control rod by means of a fuel transfer mechanism (not shown) located in the upper part of the pressure vessel. The lower end of the support rod 30 has a coupling element 34 fixed thereto, which is adapted to be releasably connected with a complementary coupling element 36 on the upper push rod section 28. More particularly, the coupling includes an annular recess or groove adapted to be engaged by the balls 38 controlled by a lock operator 40 at the upper end of the push rod. This operator will be described in greater detail hereinafter in connection with the description of the push rod and the control rod locking mechanism.

The "poison" or neutron absorbing material in the control rod is divided into relatively short cylindrical segments 42 which are disposed in coaxial relation to the support rod. The poison sections 42 have a diameter somewhat less than the inner diameter of the control rod guide tube 20 to permit clearance therebetween. Each poison section is yieldably held in position along the support rod 30 by spacers 44 and a plurality of flexible metal disc washers 46 which are disposed between each spacer and the poison section. The spacers 44 are brazed or otherwise fixed to the support rod 30 and the outer surface of each spacer is provided with a rider ring preferably formed of ceramic and split to facilitate assembly. This rider ring slidably engages the inner surface of the guide tube 20 and provides the bearing surface between the control rod and the guide tube. The flexible disc washers 46 are preferably preloaded at relatively low temperatures to ensure a predetermined minimum compression load on the sections at reactor operating temperatures. The spacers 44 are preferably a wrought, high temperature alloy such as Haynes alloy No. 25. The cushioning provided for the poison sections by the flexible disc 46 allows only actual compression loading due to differential thermal expansion and/or acceleration loads from the drive mechanism.

The end sections on the control rod 22 each include a reflector 48 of graphite or the like which is geometrically similar to the poison sections 42. With the described arrangement, an unaccountable thermal or mechanical shock of sufficient magnitude to fracture the poison material is generally localized to a relatively short length of the over-all control rod. Moreover, in the event of maximum heat generation within the core, which might result in the fusion of the metal spacers 44, the total drop of the poison sections in the guide tube would be a very small percentage of the over-all length.

The guide tube 20 is detachably fixed in position on the grid plate 18 by an interrupted screw coupling, bayonet connection, or the like, between a collar 50 on the lower end of the guide tube and a complementary coupling element 52 fixed on the grid plate. The control rod assembly and the graphite guide tube are generally self-supporting, but due to the described structural arrangement of these parts there is sufficient flexibility in such structure to permit the control rod assembly to negotiate a bowed and inclined guide tube in the event that stresses within the reactor core produce such effect.

Extending downwardly from the bottom part of the reactor vessel is a generally cylindrical, elongated housing 54 for the push rods and the drive screw, and the lower end of this housing has detachably secured thereto a control rod drive housing 56. The upper push rod section 28 is generally solid but has a relatively small axial bore therethrough to accommodate an actuator rod 58 which is provided with the lock operator 40 at its upper end and a similar operator 60 at its lower end. As seen in FIGURE 1, the lock operator 40 includes a cylindrical portion having an annular groove formed therein and adapted to receive the balls 38 and permit the latter to move out of engagement with the outer coupling element 34 and thus free the control rod 22 for upward movement. A similar locking mechanism 60 is provided for the lower end of the upper push rod section, to provide a releasable locking connection between the lower end of the upper push rod 28 and the upper end of the hollow push rod section 26 disposed therebelow.

The rod 58, which joins the lock operators 40 and 60, is spring-biased into its lowered position wherein both latches are held closed. In order to release the latches, the lower drive housing 56 is removed, together with its contents, and a tool is inserted through the bottom part of the housing and upwardly through the hollow center of the lead screw until such tool engages the lower end of the connector 60. An initial movement of the tool upward results in a release between the control rod assembly 22 and the upper push rod 28, to permit withdrawal of the control rod assembly upwardly through the guide tube 20. A second step of upward movement releases the latch 60 between the two push rod sections, thereby permitting the hollow push rod 26 to be moved downwardly. An internal shoulder 61 is preferably formed in the guide sleeve 63 in order to prevent downward movement of the solid push rod 28 when lead screw 62 and hollow push rod 26 is uncoupled and removed for servicing.

The hollow push rod 26 is connected at its lower end to a ball screw drive, including a lead screw 62 and a ball nut 64 which are disposed in a generally known manner so that rotation of the lead screw effects axial movement of the ball nut in the housing 54. The lower end of the lead screw is connected with the hydraulic motor 24 of the axial piston type, and the ball nut is splined or otherwise fixed against rotation within the actuator guide tube or housing 54, so that operation of the motor results in rotation of the lead screw 62 and vertical movement of the ball nut 64 in the guide tube. A releasable holding lock 66 is disposed a short distance below the uppermost position for the ball nut 64, in order to prevent inadvertent downward movement of the control rod and push rod assembly in the event of failure of the drive mechanism. This holding lock 64 is normally spring-biased into a position projecting within the housing 54 and is solenoid operated so that it can be withdrawn from the housing when desired, as during regulating movement of the control rod. The control rod drive mechanism 12 includes a backstop clutch and brake, indicated generally at 68 to prevent drifting of the lead screw downwardly.

The hydraulic motor 24 is suitably connected with a source of fluid pressure through control valve means 70. Such valves include a directional regulating valve 72, which is adapted to direct the flow of fluid during ordinary regulating movement of the control rod, and there is also provided scram valves 74 and 76, which are operated only during emergency situations to provide an accelerated flow of fluid to the motor and which include pilot valves 78 and 80, respectively. The use of a plurality of scram valves is particularly effective in checking the operation of the drive mechanism without actually producing movement of the control rod. The pressure fluid for scramming operation of the control rod is contained in an accumulator 82 having a piston 84 which is constantly under pressure. The pressure is maintained by the compressed volume of gas below the piston 84. This volume is initially precharged to a set pressure from an external gas pressure source and is constantly maintained at this pressure throughout the operation of the reactor. During scramming operation the scram pilot and scram main valves are immediately positioned to provide for the flow of pressure fluid directly from the accumulator 82 to the hydraulic motor 24, and the latter is thereby operated at a greatly accelerated rate.

The axial piston type hydraulic motor 24, shown in connection with the control rod drive mechanism 12, includes a motor drive shaft 90 connected at its upper end with a driven shaft 92 which, in turn, is connected to the lead screw 62. The driven shaft 92 is associated with a back-stopping clutch and brake assembly 68, which is adapted to prevent drifting of the lead screw downwardly. Also located on the motor driven shaft is a scram deceleration valve means 94 which is adapted to provide a throttling effect on the flow of pressure fluid out of the drive motor during the latter portion of upward travel of the control rod sections.

With reference particularly to FIGURE 2, it will be seen that the motor driven shaft 92 is affixed to the drive shaft 90 by means of a key 96, with the drive shaft end being located in an axial bore in the connecting end of the driven shaft and the key inserted therebetween. The driven shaft 92 is suitably journalled, as by means of a ball type bearing means 98, within a sub-housing 100 disposed above the hydraulic motor 24. A sleeve 102 is disposed in coaxial relation to the lower end of the driven shaft 92 and is splined thereto in a manner affording axial translation of the sleeve relative to the shaft. A lower portion of this sleeve includes an enlarged central bore portion, which receives a compression spring 104 that is disposed in encircling relation to the driven shaft and extends between a shoulder formed internally of the sleeve and a spring retainer 106 disposed on the motor drive shaft. The outer surface of the sleeve 102 is threaded and carries a deceleration nut 108. This deceleration nut has a laterally projecting portion 110 which is keyed to the housing 100 to prevent rotation of the nut relative to the housing. Consequently, rotation of the motor drive shaft 90 and the driven shaft 92 causes rotation of the sleeve 102, but since the deceleration nut 108 is held against rotation, the rotation of the sleeve results in axial or vertical translation of the nut 108 within the housing 100.

As seen in FIGURE 2, the deceleration nut 108 is disposed adjacent the lower end of its travel on the threaded sleeve 102, at which position the control rod 22 (FIGURE 1) is in a lower position within the guide tube 20. As the hydraulic motor 24 is actuated to effect rotation of the drive shaft and upward movement of the control rod, the accompanying rotation of the sleeve 102 causes upward movement of the deceleration nut 108. As the nut progresses upwardly, it engages a lower shoulder portion 112 of a slidable cylindrical valve sleeve 114, which is arranged and constructed to control the rate of fluid discharge from the motor 24 and to provide for deceleration of the rate of rotation of the lead screw 62 as the control rod 22 approaches its upper position within the reactor core.

More particularly, the pressure fluid from the motor 24 is discharged through the line 116 (see also FIGURE 1) which is in communication with the deceleration valve housing 100 and the discharge fluid passes from the latter through a line 118 back to the source or reservoir. The rate of flow through the deceleration valve housing is controlled by the deceleration valve 94, which includes a fixed outer shell 120, having ports 122 and 124 therethrough which communicate respectively with the motor discharge line 116 and the return line 118 leading back to the source or reservoir for the motor. Disposed coaxially of the driven shaft 92 and within the shell 120 is the relatively slidable sleeve or spool 114, which is normally urged downwardly by a coil spring 126 disposed about the shaft 92 and intermediate a seat 128 on the valve spool and a seat provided by a collar 130 at the upper end portion of the valve housing 100.

The valve sleeve or spool 114 is provided at its outer surface with a groove or recess 132 including a tapered wall section 134 at its lower end. The spool 114 is normally seated in the shell 120, by means of a ring 136, so that the groove 132 is located to permit a predetermined full flow from the motor discharge line 116 through the port 122 into the port 124 and thence to the return line 118. This fully open position of the valve is maintained during the lower part of ordinary regulating movement of the control rod and, also, during the initial movement of the control rod in a "scram" operation. As the shaft 92 rotates to drive the ball nut 64 toward the upper end of its travel, and the control rod 22 driven thereby approaches its uppermost position within the reactor core, the deceleration nut 108 moves into engagement with the lower shoulder portion 112 of the valve spool and drives the latter upwardly. The resulting upward movement of the spool 114 causes the inclined wall 134 of the recess 132 to move toward a shoulder forming ring 140 within the valve shell 120 and thereby throttle the flow through port 122 and into the return line 118. This throttling action preferably occurs during the last two feet of an eight foot stroke for the control rod. Finally, a shoulder 142 on the valve spool 114 engages the shoulder 140 in the shell 120 to substantially seal off flow into the return line 118. Preferably, this sealing engagement of the shoulders 140 and 142 occurs several inches before the end of the control rod travel and the final travel of the rod is permitted by leakage through the valve which, in effect, cushions the control rod.

In the "scram" operation of the fluid motor, there is, of course, a considerably greater rate of flow of fluid through the motor 24 than during ordinary regulatory operation. Correspondingly, there is a much faster travel rate of the deceleration nut 108 and a faster throttling movement of the valve spool 114. In such case, should the valve spool 114 or nut 108 become seized to hold the valve in an open or partially open position, the shock resulting from the control rod reaching the end of its stroke at too great a speed would very likely cause considerable damage to the control rod drive mechanism. Consequently, in order to avoid this possibility, there is also provided a mechanical means for decelerating and absorbing the energy of the control rod movement as it moves through its final stage of movement into the reactor core. In this respect, it will be noted that the end of the sleeve 102 encircling the driven shaft 92 is provided with an annular projecting portion, which has fixed thereto a deceleration ring 150 which is preferably of a relatively soft material, such as brass. The lower portion of this ring is disposed in overlying relation to a thread cutting device which is fixed to the sub-housing 100 and which includes a plurality of thread cutting teeth 152, or the like.

When the deceleration nut 108 has alvanced upwardly into engagement with the shoulder 112 on the lower end of the deceleration valve spool 114 and the latter is seized so that it does not move upwardly in response to the thrust of the deceleration nut, or the nut 108 has seized in such manner that it no longer moves upwardly, the rotating force of the sleeve 102 causes the sleeve to move downwardly along the shaft 92 in opposition to the compression spring 104. This downward movement of the sleeve 102, in turn, places the rotating brass ring 150 in engagement with the thread cutters 152 and the energy of the rotating sleeve and shaft 92 is thereby absorbed by the cutting of the brass ring. This causes the drive shaft 92 to be halted without damage to the deceleration valve parts. The brass ring 150, of course, becomes locked with the thread cutters 152, but the drive mechanism is readily placed in operable condition by removing the drive housing and replacing the brass ring.

Thus it is seen that there is provided a fluid pressure operated control rod drive means having a deceleration device which is effective to retard the rate of movement of the control rod into the reactor core during the final portion of its travel and which also includes an emergency stop device for the drive means. Although shown and described with respect to particular apparatus, it will be apparent that the invention disclosed herein may also be used to advantage in conjunction with other structures.

What is claimed is:

1. Drive mechanism comprising a pressure fluid operated motor, a source of pressure fluid in communication with said motor, a rotatable shaft driven by said motor, and a deceleration means carried by said shaft and comprising a housing enclosing a portion of said shaft, said housing including an inlet port in communication with the pressure fluid discharge from the motor and an outlet port in communication with said inlet port, a valve means in said housing for controlling the flow of fluid through said ports and including a spool mounted coaxially of said shaft and adapted to move along the shaft between a first position permitting the flow of discharge fluid into said inlet port and through said housing and a second position preventing the flow of discharge fluid into said inlet port, means biasing said spool toward said first position, a sleeve non-rotatably fixed to said shaft for rotation therewith, a deceleration nut threaded on said sleeve and including a portion adapted to engage said spool, and means connecting said nut with said housing in a manner preventing rotation of said nut but affording axial movement thereof within said housing, whereby rotation of said shaft and said sleeve causes said deceleration nut to move axially of said housing until said portion of said nut engages said spool and causes the latter to move to said position preventing flow of pressure fluid through said housing.

2. Drive mechanism comprising a pressure fluid operated motor, a source of pressure fluid in communication with said motor, a rotatable shaft driven by said motor, and a deceleration means carried by said shaft and comprising a housing enclosing a portion of said shaft, conduit means providing fluid communication between the interior of said housing and the fluid discharge side of said motor, additional conduit means providing for the return flow of fluid from said housing to said source, a valve means in said housing for controlling the flow of fluid therethrough and including a spool mounted coaxially of said shaft and adapted to move along the shaft between a first position affording the flow of discharge fluid through said housing and a second position preventing the flow of discharge fluid through said housing, spring means within said housing yieldably holding said spool in said first position, a sleeve non-rotatably fixed to said shaft for rotation therewith, a deceleration nut threaded on said sleeve and including a portion adapted to engage said spool, and means connecting said nut with said housing in a manner preventing rotation of said nut but affording axial movement thereof along said spool, said deceleration nut and said spool being disposed so that a predetermined amount of rotation of said shaft and said sleeve causes said deceleration nut to move axially of said housing and toward said spool until said portion of said nut engages said spool, and further rotation of said shaft and said nut causes said spool to move to said position preventing flow of pressure fluid through said housing.

3. A drive means adapted for use in connection with a control rod for a nuclear reactor, comprising a pressure fluid operated, reversible motor, a source of pressure fluid in communication with said motor, a rotatable shaft driven by said motor, means connected with said shaft and adapted for connection with a control rod in a manner affording axial movement of the control rod in response to rotation of said shaft, valve means intermediate said source and said motor and selectively operable to control the flow of fluid to said motor, and additional valve means disposed between the fluid discharge side of said motor and said source for controlling the return flow of fluid to said source from said motor, said additional valve means comprising a housing enclosing a portion of said shaft and having a fluid inlet port and a fluid outlet port, conduit means placing said inlet port in communication with the fluid discharge side of said motor and said outlet port in communication with said source, a spool in said housing which is movable axially of said housing in flow controlling relation to said inlet and outlet ports, said spool including means for progressively throtting the flow through said inlet port and for sealing said inlet port, means urging said spool into a position affording full flow of fluid through said ports, a sleeve splined to said shaft to afford axial movement therealong, a nut threadedly engaging the exterior of said sleeve and including a portion disposed for engagement with said spool to effect axial movement of the latter, means connecting said nut with said housing in a manner preventing rotation of said nut but permitting movement thereof axially of said housing and toward said spool in response to rotation of said shaft in a predetermined direction, means yieldably resisting axial movement of said sleeve in a direction away from said spool, a metal ring fixed to said sleeve for rotation therewith, and a metal cutting element disposed in fixed position within said housing and in axially spaced relation to said metal ring when the latter is held against movement in said direction away from said spool by said yieldable means, whereby the rotation of said shaft and sleeve in said predetermined direction causes said nut to move axially of said housing and toward said spool until said nut portion engages said spool and moves the latter to throttle the flow through said inlet port and then closes said port, and whereby failure of said spool to move sufficiently to close off said inlet port creates a reverse axial thrust on said sleeve to move the latter into a position away from said spool and so that the rotating metal ring on the sleeve is engaged by said cutting element to thereby absorb the energy of the rotating shaft and halt the latter.

4. A drive means adapted for use in connection with a control rod for a nuclear reactor comprising a pressure fluid operated, reversible motor, a source of pressure fluid in communication with said motor, a rotatable shaft driven by said motor, means connected with said shaft and adapted for connection with a control rod in a manner affording axial movement of the control rod in response to rotation of said shaft, the movement of said shaft in one direction causing the control rod to move into the reactor core and the reverse rotation of said shaft causing withdrawal of the rod from the core, valve means disposed between the fluid discharge side of said motor and said source for controlling the return flow of fluid to said source from said motor, said valve means comprising a housing enclosing a portion of said shaft and having a fluid inlet port and a fluid outlet port, means placing said inlet port in communication with the fluid discharge side of said motor, a spool in said housing which is movable axially of said housing in flow controlling relation to said inlet and outlet ports, said spool including means for progressively throttling the flow through said inlet port and for sealing said inlet port, means urging said spool into a position affording full flow of fluid through said ports, a sleeve splined to said shaft to afford axial movement therealong, a nut threadedly engaging the exterior of said sleeve and including a portion disposed for engagement with said spool after a predetermined amount of shaft rotation in said one direction so as to effect axial movement of the spool to throttle the flow of fluid through said inlet port and then close the latter after a further predetermined amount of rotation in said one direction, means connecting said nut with said housing in a manner preventing rotation of said nut but permitting movement thereof axially of said housing and toward said spool in response to rotation of said shaft in said one direction, means yieldably resisting axial movement of said sleeve in a direction away from said spool, a metal ring fixed to said sleeve for rotation therewith, and a metal cutting element disposed in fixed position within said housing and in axially spaced relation to said metal ring when the latter is held against movement in said direction away from said spool by said yieldable means, whereby the rotation of said shaft and sleeve in said one direction is effective to move the control rod into the reactor core and causes said nut to move axially of said housing and toward said spool until said nut portion engages said spool and causes the latter to throttle the flow through said inlet port to decelerate the control rod and then close said inlet port to halt the control rod movement, and whereby failure of said spool to move sufficiently to close off said inlet port creates a reverse axial thrust on said sleeve to move the latter into a position away from said spool and so that the rotating metal ring on the sleeve is engaged by said cutting element to thereby absorb the energy of the rotating shaft and halt the latter.

References Cited in the file of this patent

UNITED STATES PATENTS

| | | |
|---|---|---|
| 2,633,830 | McCourty et al. | Apr. 7, 1953 |
| 2,699,150 | Ziskal | Jan. 11, 1955 |
| 2,937,984 | Chapellier | May 24, 1960 |
| 2,948,265 | Jensen | Aug. 9, 1960 |
| 2,975,119 | Emmons | Mar. 14, 1961 |
| 2,990,356 | Chapellier et al. | June 27, 1961 |
| 3,007,448 | Erikson | Nov. 7, 1961 |
| 3,013,532 | Harper | Dec. 19, 1961 |

FOREIGN PATENTS

| | | |
|---|---|---|
| 621,466 | Canada | June 6, 1961 |